(12) United States Patent
Julian et al.

(10) Patent No.: US 7,644,902 B1
(45) Date of Patent: Jan. 12, 2010

(54) APPARATUS FOR PRODUCING A RETORT THERMAL PROCESSED CONTAINER WITH A PEELABLE SEAL

(75) Inventors: Randy K. Julian, Newburgh, IN (US); Gary V. Montgomery, Evansville, IN (US)

(73) Assignee: Rexam Medical Packaging Inc., Evansville, IN (US)

( * ) Notice: Subject to any disclaimer, the term of this patent is extended or adjusted under 35 U.S.C. 154(b) by 1513 days.

(21) Appl. No.: 10/449,335

(22) Filed: May 31, 2003

(51) Int. Cl.
*A47K 1/08* (2006.01)

(52) U.S. Cl. .......................... 248/313; 53/285; 53/416; 141/383; 141/386; 215/44; 220/324; 248/312

(58) Field of Classification Search ........... 53/351–352, 53/363, 364, 285, 416; 198/179, 418, 803.1; 248/229.13, 230.1, 230.4, 230.9, 312, 313, 248/316.5, 205.1, 224.7, 229.1, 231.51; 215/43–45, 321, 316, 317, 342, 344; 220/315, 220/324–328; 141/383, 386, 346
See application file for complete search history.

(56) References Cited

U.S. PATENT DOCUMENTS

| | | | |
|---|---|---|---|
| 946,138 A * | 1/1910 | Kirkegaard | 53/351 |
| 1,346,112 A | 7/1920 | Bruns | |
| 1,556,020 A | 10/1925 | Noll | |
| 1,910,913 A | 5/1933 | Conner | |
| 1,916,977 A | 7/1933 | Gutmann | |
| 1,937,492 A | 11/1933 | Merolle | |
| 1,961,033 A | 5/1934 | Bicks | |
| 1,995,350 A | 3/1935 | Hoag | |
| 2,039,757 A | 5/1936 | Von Till | |
| 2,085,934 A | 7/1937 | Von Till | |
| 2,087,251 A * | 7/1937 | Gough | 53/351 |
| 2,188,946 A | 2/1940 | Gutmann | |
| 2,242,256 A | 5/1941 | McManus | |
| 2,312,513 A | 3/1943 | Wilson | |
| 2,620,939 A | 12/1952 | Weisgerber | |
| 2,643,021 A | 6/1953 | Freedman | |
| 2,670,869 A | 3/1954 | Martin | |
| 2,681,742 A | 6/1954 | Miller | |
| 2,686,606 A | 8/1954 | Froitzheim | |
| 2,686,607 A | 8/1954 | Zander | |
| 2,748,969 A | 6/1956 | Leary | |
| 2,904,837 A | 9/1959 | Crabbe | |
| 2,929,525 A | 3/1960 | Glover | |
| 3,143,364 A | 8/1964 | Klein | |

(Continued)

FOREIGN PATENT DOCUMENTS

CA            2572379        12/2006

(Continued)

*Primary Examiner*—Amy J Sterling
*Assistant Examiner*—Tan Le
(74) *Attorney, Agent, or Firm*—James E. Cole; Chad D. Bruggeman; Middleton Reutlinger

(57) ABSTRACT

A clamping fixture for a retort process wherein a clamping fixture is disposed about a container having a seal positioned over a container-dispensing aperture. The clamping fixture applies a force to an outer surface of the seal in order to combat internal vapor pressures, which rise during a retort process and may break the seal. A first embodiment may be used with a manual process while a second embodiment may be used with a multiple station automated retort process.

10 Claims, 4 Drawing Sheets

U.S. PATENT DOCUMENTS

| | | |
|---|---|---|
| 3,169,656 A | 2/1965 | Wieckmann |
| 3,186,209 A | 6/1965 | Friedman |
| 3,189,209 A | 6/1965 | Owens |
| 3,224,617 A | 12/1965 | Hohl |
| 3,245,857 A | 4/1966 | Rutledge |
| 3,255,907 A | 6/1966 | Eddy |
| 3,266,658 A | 8/1966 | Meissner |
| 3,331,523 A | 7/1967 | Exton |
| 3,360,149 A | 12/1967 | Roth |
| 3,501,042 A | 3/1970 | Risch |
| 3,527,343 A | 9/1970 | Manning |
| 3,530,917 A | 9/1970 | Donovan |
| 3,547,294 A | 12/1970 | Williams |
| 3,612,325 A | 10/1971 | Williams |
| 3,632,004 A | 1/1972 | Grimes |
| 3,788,510 A | 1/1974 | Collins |
| 3,815,314 A | 6/1974 | Pollock et al. |
| 3,823,182 A | 7/1974 | Nonaka et al. |
| 3,845,525 A | 11/1974 | Gaylord |
| 3,879,492 A | 4/1975 | Botinick |
| 3,910,410 A | 10/1975 | Shaw |
| 3,917,100 A | 11/1975 | Dukess |
| 3,923,179 A | 12/1975 | Choksi |
| 3,923,182 A | 12/1975 | Choksi |
| 3,923,183 A | 12/1975 | Choksi |
| 3,923,184 A | 12/1975 | Choksi |
| 3,923,185 A | 12/1975 | Choksi |
| 3,938,847 A * | 2/1976 | Peyton ................ 198/418 |
| 3,944,103 A | 3/1976 | Cros |
| 3,980,194 A | 9/1976 | Costa |
| 3,998,032 A * | 12/1976 | Koebbeman .............. 53/352 |
| 4,007,848 A | 2/1977 | Snyder |
| 4,009,793 A | 3/1977 | Minesinger et al. |
| 4,013,188 A | 3/1977 | Ray |
| 4,036,353 A * | 7/1977 | Suter ................ 198/803.9 |
| 4,066,181 A | 1/1978 | Robinson et al. |
| 4,076,152 A | 2/1978 | Mumford |
| 4,091,949 A | 5/1978 | Fowles et al. |
| 4,093,093 A | 6/1978 | Fowles et al. |
| 4,109,815 A | 8/1978 | Collins, III |
| 4,128,184 A | 12/1978 | Northup |
| 4,151,924 A | 5/1979 | Jameson |
| 4,181,232 A | 1/1980 | Bellamy et al. |
| 4,204,604 A | 5/1980 | Morin et al. |
| 4,207,990 A | 6/1980 | Weiler et al. |
| 4,209,126 A | 6/1980 | Elias |
| 4,266,687 A | 5/1981 | Cummings |
| 4,275,817 A | 6/1981 | Patton |
| 4,276,989 A | 7/1981 | Hicks |
| 4,280,653 A | 7/1981 | Elias |
| 4,358,919 A | 11/1982 | Hirota et al. |
| 4,364,485 A | 12/1982 | Knapp |
| 4,369,889 A | 1/1983 | Ostrowsky |
| 4,378,894 A | 4/1983 | Willis et al. |
| 4,381,840 A | 5/1983 | Ostrowsky |
| 4,382,521 A | 5/1983 | Ostrowsky |
| 4,392,579 A | 7/1983 | Uhlig et al. |
| 4,423,821 A | 1/1984 | McIntosh |
| 4,427,126 A | 1/1984 | Ostrowsky |
| 4,430,288 A | 2/1984 | Bonis |
| 4,434,904 A | 3/1984 | D'Amico et al. |
| 4,457,440 A | 7/1984 | Dukess |
| 4,473,163 A | 9/1984 | Geiger |
| 4,493,427 A | 1/1985 | Wolkonsky |
| 4,496,674 A | 1/1985 | Ehrhart et al. |
| 4,501,371 A | 2/1985 | Smalley |
| 4,526,279 A | 7/1985 | Weiler et al. |
| 4,527,705 A | 7/1985 | Prades |
| 4,564,117 A | 1/1986 | Herbert |
| 4,576,297 A | 3/1986 | Larson |
| 4,583,665 A | 4/1986 | Barriac |
| 4,588,099 A | 5/1986 | Diez |
| 4,625,875 A | 12/1986 | Carr et al. |
| 4,637,519 A | 1/1987 | Dutt et al. |
| 4,638,913 A | 1/1987 | Howe, Jr. |
| 4,643,330 A | 2/1987 | Kennedy |
| 4,648,520 A | 3/1987 | Stull |
| 4,651,886 A | 3/1987 | Stull |
| 4,662,529 A | 5/1987 | Moore |
| 4,668,458 A | 5/1987 | Whitney |
| 4,674,642 A | 6/1987 | Towns et al. |
| 4,674,643 A | 6/1987 | Wilde et al. |
| 4,682,463 A | 7/1987 | Foldesi |
| 4,683,016 A | 7/1987 | Dutt et al. |
| 4,704,180 A | 11/1987 | Marsella et al. |
| 4,705,188 A | 11/1987 | Rahn |
| 4,706,835 A | 11/1987 | Kreiseder |
| 4,709,815 A | 12/1987 | Price et al. |
| 4,721,215 A | 1/1988 | Bertaud |
| 4,722,447 A | 2/1988 | Crisci |
| 4,723,685 A | 2/1988 | Fillmore et al. |
| 4,730,748 A | 3/1988 | Bane |
| 4,738,370 A | 4/1988 | Urmston et al. |
| 4,747,500 A | 5/1988 | Gach et al. |
| 4,747,502 A | 5/1988 | Luenser |
| 4,754,890 A | 7/1988 | Ullman et al. |
| 4,754,892 A | 7/1988 | Retief |
| 4,757,914 A | 7/1988 | Roth et al. |
| 4,764,403 A | 8/1988 | Ajmera |
| 4,778,698 A | 10/1988 | Ou-Yang |
| 4,779,750 A | 10/1988 | Armstrong |
| 4,782,968 A | 11/1988 | Hayes |
| 4,801,037 A | 1/1989 | Hayashida et al. |
| 4,807,745 A | 2/1989 | Langley et al. |
| 4,807,770 A | 2/1989 | Barriac |
| 4,809,858 A | 3/1989 | Ochs |
| 4,810,541 A | 3/1989 | Newman et al. |
| 4,815,617 A | 3/1989 | Cullum |
| 4,818,577 A | 4/1989 | Ou-Yang |
| 4,842,951 A | 6/1989 | Yamada et al. |
| 4,846,359 A | 7/1989 | Baird et al. |
| 4,875,594 A | 10/1989 | Ochs |
| 4,879,147 A | 11/1989 | Newman et al. |
| 4,881,649 A | 11/1989 | Hsu et al. |
| 4,892,911 A | 1/1990 | Genske |
| 4,893,718 A | 1/1990 | Delespaul et al. |
| 4,894,266 A | 1/1990 | Bauer et al. |
| 4,896,783 A | 1/1990 | Leoncavallo et al. |
| 4,935,273 A | 6/1990 | Ou-Yang |
| 4,981,229 A | 1/1991 | Lanham |
| 4,981,230 A | 1/1991 | Marshall et al. |
| 4,991,731 A | 2/1991 | Osip et al. |
| 4,997,097 A | 3/1991 | Krautkramer |
| 5,002,811 A | 3/1991 | Bauer et al. |
| 5,006,384 A | 4/1991 | Genske |
| 5,007,546 A | 4/1991 | Rose et al. |
| 5,009,323 A | 4/1991 | Montgomery et al. |
| 5,009,324 A | 4/1991 | Ochs |
| 5,011,719 A | 4/1991 | Gehrke et al. |
| 5,012,946 A | 5/1991 | McCarthy |
| 5,023,121 A | 6/1991 | Pockat et al. |
| 5,031,787 A | 7/1991 | Ochs |
| 5,058,755 A | 10/1991 | Hayes |
| 5,061,532 A | 10/1991 | Yamada |
| 5,069,355 A | 12/1991 | Matuszak |
| 5,071,686 A | 12/1991 | Genske et al. |
| 5,078,290 A | 1/1992 | Ochs |
| 5,092,469 A | 3/1992 | Takata et al. |
| 5,093,164 A | 3/1992 | Bauer et al. |
| 5,110,642 A | 5/1992 | Genske |
| 5,135,125 A | 8/1992 | Andel et al. |
| 5,151,317 A | 9/1992 | Bothe |
| 5,160,767 A | 11/1992 | Genske et al. |
| 5,175,035 A | 12/1992 | Pinsolle et al. |

| Patent/Pub No. | Date | Name |
|---|---|---|
| 5,176,271 A | 1/1993 | Painchaud et al. |
| 5,178,293 A | 1/1993 | Suzuki et al. |
| 5,197,618 A | 3/1993 | Goth |
| 5,197,620 A | 3/1993 | Gregory |
| 5,197,621 A | 3/1993 | Bartl et al. |
| 5,255,813 A | 10/1993 | Berggren et al. |
| 5,258,191 A | 11/1993 | Hayes |
| 5,259,522 A | 11/1993 | Morton |
| 5,265,745 A | 11/1993 | Pereyra et al. |
| 5,302,442 A | 4/1994 | O'Brien et al. |
| 5,342,684 A | 8/1994 | Carespodi |
| 5,346,082 A | 9/1994 | Ochs et al. |
| 5,353,665 A * | 10/1994 | Heebner .................. 81/3.2 |
| 5,381,913 A | 1/1995 | Peeters |
| 5,407,751 A | 4/1995 | Genske et al. |
| 5,415,306 A | 5/1995 | Luch et al. |
| 5,421,470 A | 6/1995 | Dudzik |
| 5,433,992 A | 7/1995 | Galda et al. |
| 5,447,792 A | 9/1995 | Brandt et al. |
| 5,469,968 A | 11/1995 | Matthews et al. |
| 5,492,757 A | 2/1996 | Schuhmann et al. |
| 5,500,265 A | 3/1996 | Ambroise et al. |
| 5,513,781 A | 5/1996 | Ullrich et al. |
| 5,523,136 A | 6/1996 | Fischer et al. |
| 5,533,622 A | 7/1996 | Stockley, III et al. |
| 5,551,608 A | 9/1996 | Moore et al. |
| 5,615,789 A | 4/1997 | Finkelstein et al. |
| 5,626,929 A | 5/1997 | Stevenson |
| 5,664,694 A | 9/1997 | Bietzer et al. |
| 5,685,443 A | 11/1997 | Taber et al. |
| 5,702,015 A | 12/1997 | Giles et al. |
| 5,720,401 A | 2/1998 | Moore |
| 5,723,507 A | 3/1998 | Markovich et al. |
| 5,738,231 A | 4/1998 | Montgomery |
| 5,756,178 A | 5/1998 | Obadia |
| 5,773,136 A | 6/1998 | Alder et al. |
| 5,785,195 A | 7/1998 | Zwemer et al. |
| 5,788,101 A | 8/1998 | King |
| 5,837,369 A | 11/1998 | Grunberger et al. |
| 5,850,951 A | 12/1998 | Hayes |
| 5,851,640 A | 12/1998 | Schuhmann et al. |
| 5,860,544 A | 1/1999 | Brucker |
| 5,862,928 A | 1/1999 | Breuer et al. |
| 5,875,909 A | 3/1999 | Guglielmini |
| 5,882,789 A | 3/1999 | Jones et al. |
| 5,884,788 A | 3/1999 | Wilde |
| 5,902,075 A | 5/1999 | Krings |
| 5,915,577 A | 6/1999 | Levine |
| 5,925,430 A | 7/1999 | Bayer et al. |
| 5,927,530 A | 7/1999 | Moore |
| 5,929,128 A | 7/1999 | Whetten et al. |
| 5,947,311 A | 9/1999 | Gregory |
| 5,973,077 A | 10/1999 | Kan et al. |
| 5,992,661 A | 11/1999 | Zumbuhl |
| 5,997,968 A | 12/1999 | Dries et al. |
| 6,006,930 A | 12/1999 | Dreyer et al. |
| 6,044,994 A | 4/2000 | Miller |
| 6,056,136 A | 5/2000 | Taber et al. |
| 6,056,141 A | 5/2000 | Navarini et al. |
| 6,068,933 A | 5/2000 | Shepard et al. |
| 6,082,566 A | 7/2000 | Yousif et al. |
| 6,082,568 A | 7/2000 | Flanagan |
| 6,089,390 A | 7/2000 | Druitt et al. |
| 6,105,800 A | 8/2000 | Czesak |
| 6,119,422 A | 9/2000 | Clear et al. |
| 6,119,883 A | 9/2000 | Hock et al. |
| 6,123,212 A | 9/2000 | Russell et al. |
| 6,152,316 A | 11/2000 | Niese |
| 6,152,319 A | 11/2000 | Kamachi et al. |
| 6,158,604 A | 12/2000 | Larguia, Sr. et al. |
| 6,165,576 A | 12/2000 | Freedman et al. |
| 6,179,139 B1 | 1/2001 | Heilman |
| 6,202,871 B1 | 3/2001 | Kelly |
| 6,206,871 B1 | 3/2001 | Zanon et al. |
| 6,220,466 B1 | 4/2001 | Hayes et al. |
| 6,231,975 B1 | 5/2001 | Kong et al. |
| 6,234,338 B1 | 5/2001 | Searle |
| 6,235,822 B1 | 5/2001 | Whetten et al. |
| 6,237,789 B1 | 5/2001 | Zhu |
| 6,239,210 B1 | 5/2001 | Kim et al. |
| 6,253,939 B1 | 7/2001 | Wan et al. |
| 6,253,940 B1 | 7/2001 | Graham et al. |
| 6,257,430 B1 | 7/2001 | Rinnie et al. |
| 6,265,083 B1 | 7/2001 | Tanizaki et al. |
| 6,276,543 B1 | 8/2001 | German et al. |
| 6,277,478 B1 | 8/2001 | Kurita et al. |
| 6,302,321 B1 | 10/2001 | Reese et al. |
| 6,315,140 B1 | 11/2001 | Nadel |
| 6,382,443 B1 | 5/2002 | Gregory |
| 6,382,445 B1 | 5/2002 | McCandless |
| 6,419,101 B1 | 7/2002 | Hessel et al. |
| 6,477,823 B1 | 11/2002 | Kitterman et al. |
| 6,488,165 B1 | 12/2002 | Hidding |
| 6,502,710 B1 | 1/2003 | Bösl et al. |
| 6,659,297 B2 | 12/2003 | Gregory et al. |
| 6,848,590 B2 | 2/2005 | Brozell et al. |
| 6,854,614 B2 | 2/2005 | Sprick |
| 6,874,647 B2 | 4/2005 | Bloom et al. |
| 6,893,672 B2 | 5/2005 | Ingraham |
| 6,902,075 B2 | 6/2005 | O'Brien et al. |
| 6,913,157 B2 | 7/2005 | Oh |
| 6,948,630 B2 | 9/2005 | Julian et al. |
| 7,004,340 B2 | 2/2006 | Belden, Jr. |
| 7,021,478 B1 | 4/2006 | Hock |
| 7,168,581 B2 | 1/2007 | Robinson et al. |
| 7,175,039 B2 | 2/2007 | German et al. |
| 7,217,454 B2 | 5/2007 | Smelko et al. |
| 2001/0012868 A1 | 8/2001 | Chen et al. |
| 2002/0027123 A1 | 3/2002 | Druitt et al. |
| 2002/0066713 A1 | 6/2002 | Ma |
| 2002/0162818 A1 | 11/2002 | Williams |
| 2003/0071007 A1 | 4/2003 | Ma et al. |
| 2003/0098285 A1 | 5/2003 | Gregory et al. |
| 2003/0116524 A1 | 6/2003 | Robinson et al. |
| 2003/0150833 A1 | 8/2003 | Shenkar |
| 2004/0055992 A1 | 3/2004 | Robinson et al. |
| 2004/0173944 A1 | 9/2004 | Mueller et al. |
| 2005/0003125 A1 | 1/2005 | Barber et al. |
| 2005/0211657 A1 | 9/2005 | Mallet et al. |
| 2005/0284837 A1 | 12/2005 | Taber et al. |
| 2007/0125785 A1 | 6/2007 | Robinson et al. |
| 2007/0138125 A1 | 6/2007 | Granger |
| 2007/0187352 A1 | 8/2007 | Kras et al. |

FOREIGN PATENT DOCUMENTS

| | | |
|---|---|---|
| DE | 3237634 | 4/1984 |
| DE | 4206244 | 9/1993 |
| EP | 0269920 | 6/1988 |
| EP | 275102 | 7/1988 |
| EP | 405365 | 1/1991 |
| EP | 0421821 | 4/1991 |
| EP | 589033 | 10/1993 |
| GB | 2034288 | 6/1980 |
| JP | 02205574 | 8/1990 |
| JP | 02219769 | 9/1990 |
| JP | 2000052982 | 2/2000 |
| JP | 2001261054 | 9/2001 |
| WO | WO 9009935 | 9/1990 |
| WO | WO2006002922 | 1/2006 |
| WO | WO2007042205 | 4/2007 |

* cited by examiner

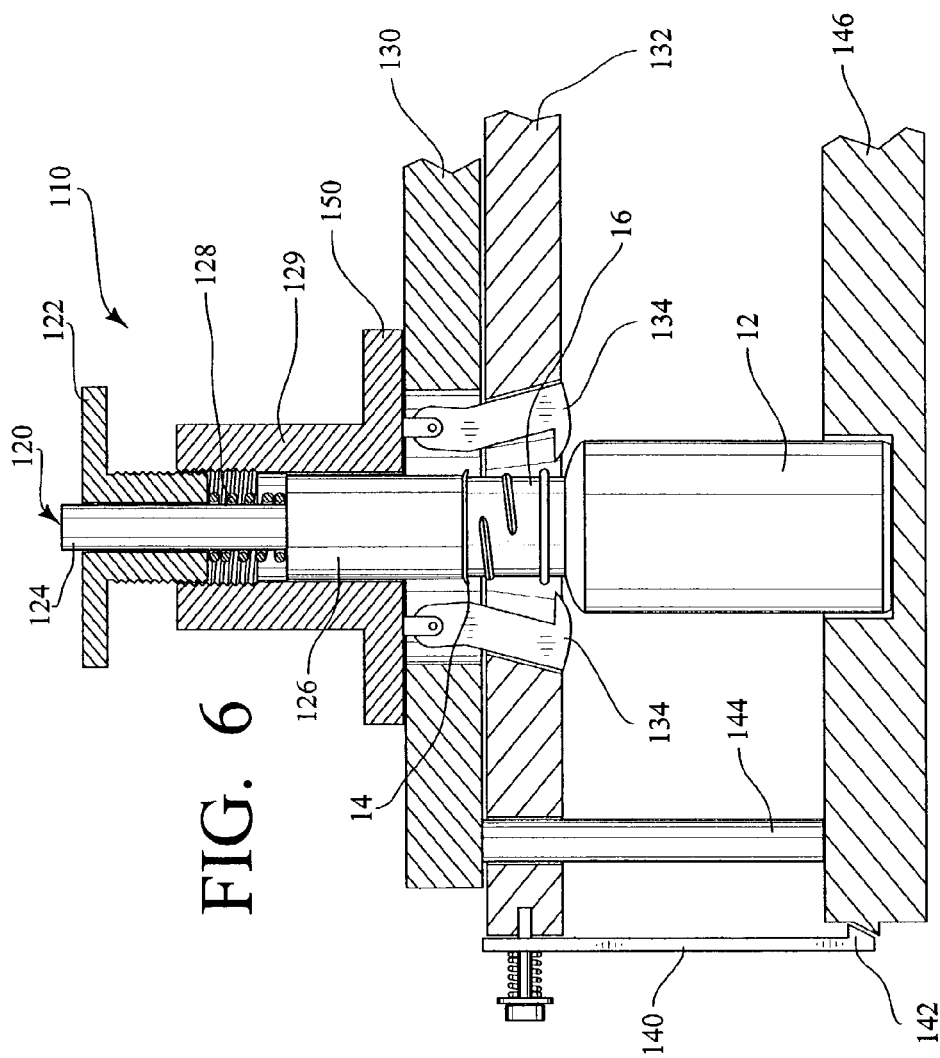

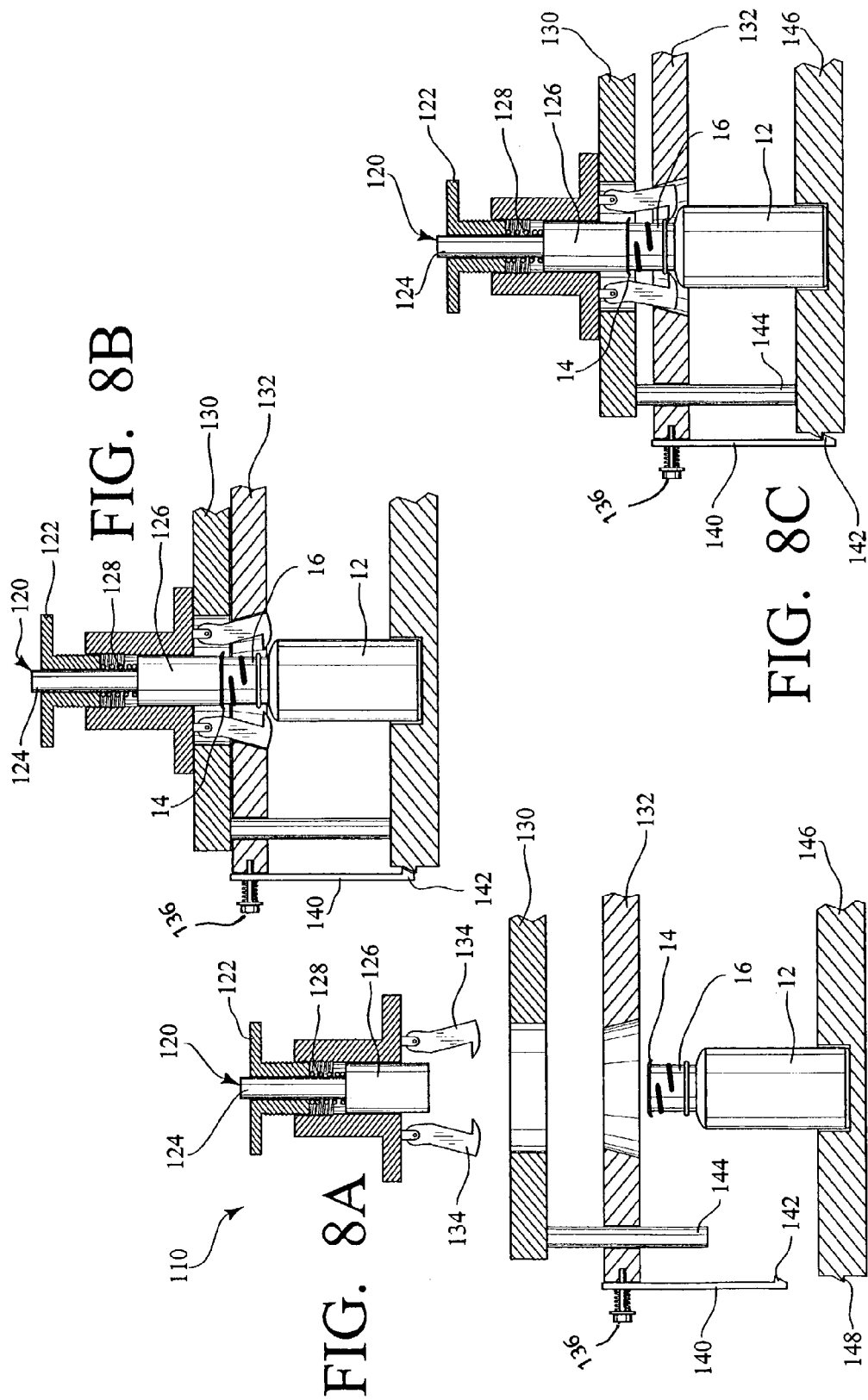

APPARATUS FOR PRODUCING A RETORT THERMAL PROCESSED CONTAINER WITH A PEELABLE SEAL

BACKGROUND OF THE INVENTION

1. Technical Field of the Invention

The present invention relates generally to peelable seal integrity and a retort process. More particularly, the invention relates to an apparatus for maintaining a peelable seal on a filled container that is sterilized during a retort process.

2. Description of the Related Art

In recent years, packaged products which are room temperature storage stable yet ready-to-use upon opening, i.e. they require no cooking or heating before use, have become extremely popular with the consumer. For many food products, this trend requires only minor packaging changes, such as modifying the package size to be consistent with the anticipated consumer use pattern. However, for products prone to bacterial contamination and spoilage, such as milk-based beverages, soups, and many other low-acid food products, this trend presents some major packaging challenges.

For example, milk-based and low-acid food products need to be sterilized to reduce the initial viable bacterial concentration in a product, thereby reducing the rate at which the product will spoil and lengthening the product's shelf life. One procedure for reducing the viable bacterial concentration is sterilization by retort processing. In the retort process, a chilled or ambient temperature product is poured into a container and the container is sealed. The container may be sealed by melding two sections of the container material together, such as by heat-sealing a seam on a pouch, or the container may be sealed by bonding a seal to the lip of the container, such as by induction sealing a foil-lined seal to a barrier polymer material bottle neck. The filled package is then sterilized at high temperature in a high-pressure water bath. In a typical commercial production rate retort process, the package is heated from an ambient temperature of about 75° F. to a sterilizing temperature in the range of from about 212° F. to about 270° F. As the exterior surface of the package is heated, the package contents are heated and the internal vapor pressure increases. By concurrently submerging the package in the water bath, a counteracting external pressure increase is applied to the container. Although the retort process is an efficient sterilization process, it is harsh on packaging materials because of the temperature and pressure variations involved. Materials commonly used for stand-up, reclosable containers, such as plastic bottles, tend to soften and distort during retort processing. Materials used for seals can soften and, because the seal material is distinct from the container material, can form small gaps or pinholes at the bond interface. These gaps or pinholes can allow product to vent out of the container as the internal pressure increases during the retort process and can allow process bath water to enter the container as the internal pressure decreases relative to the external pressure and the package returns to ambient conditions. Because the packaged beverage and the process water may pass through very small gaps at the bond interface, this event may occur even though the product appears to have an acceptable seal. Moreover, the container and seal may enter the retort process in a less than ideal condition because the process to adhere the seal to the container can cause the neck, the lip, the threads or a combination thereof on the container to slightly distort. If the seal is transferred to the neck with a closure mounted on the container, the skirt, top, threads or a combination thereof on the closure may distort during the seal transfer process. These material failures can increase the number of manufacturing errors and can allow for product contamination even on packages that appear to meet quality standards.

Barrier pouches minimize the risk of material failures during retort processing because the pouch usually has sufficient flexibility that it can alter its shape in response to the over pressure conditions of the retort process. Moreover, barrier pouches generally have minimal headspace within the sealed pouch so the packages are less affected by the external pressure changes than are packages with relatively large headspaces, such as semi-rigid bottle-like containers. Further, the seals or bonds are created by melding the pouch material to itself thereby creating strong, non-distinct bonds. Hence, well-sealed packages which are not dependent on maintaining their original shape can be produced. However, the pouches usually require specialized devices, such as sharp-tipped straws, to open the package and do not allow the container to reclose the package after opening.

For bottles or similar stand-up containers that are sealed such that the seal can withstand the retort process, a different problem may be created. The seal may adhere so tightly to the container lip that when the consumer attempts to remove the seal, the seal may be very difficult to remove from the container and/or may tear into small pieces and leave fragments along the container rim. If the product is a beverage or similar liquid product, the product may settle under the seal fragments as the beverage is dispensed. This can make the product aesthetically unacceptable and unpleasant for repeated use by the consumer and increase the probability of bacterial contamination under the seal fragments. Further, the user risks being cut or scratched by the remaining foil bits along the container lip. Semi-rigid containers also have relatively large headspaces thereby allowing the user to shake and remix the product immediately before dispensing. However, during retort processing, the air-filled headspace will be affected more rapidly than the liquid product by the temperature changes increasing the pressure against the seal and thereby increasing the probability of seal failure.

In view of the deficiencies in known retort process seals, it is apparent that an apparatus is needed for use with a container seal in order to maintain seal integrity during a retort process wherein high temperature and high pressures applied to a container may cause seal failure.

SUMMARY OF THE INVENTION

It is an object of the present invention to provide a clamping fixture for use with a container during a retort process.

It is yet a further object of the present invention to maintain an effective sealing pressure on a closure or seal disposed over a container.

It is a further object of the present invention to provide a spring biased plunger having a plunger head in contact with a peelable seal or a closure throughout the retort process.

It is an even further object of the present invention to provide a plunger handle for rotatably applying a preselected pressure to the peelable seal or closure.

It is still an even further object of the present invention to provide a manually operated clamping fixture and a multiple station clamping fixture for use at commercial production rates.

Specifically, the present invention provides a clamping fixture for a retort process, comprising a clamping fixture disposed about a container, the clamping fixture having a spring biased plunger extending through the clamping fixture and sealably engaging a container dispensing aperture, the clamping fixture having a first clamping fixture plate and a second clamping fixture plate spaced apart from the first plate, the second plate disposed about the container, the plunger comprising a plunger shaft, a plunger handle connected to an upper end of the plunger shaft, and a plunger head at a lower end of the plunger shaft opposite the plunger handle, the plunger shaft disposed through a first clamping fixture plate and a plunger spring, the plunger spring positioned between said first clamping fixture plate and said plunger head, a base plate having a U-shaped container seat said base plate being operably connected to said first clamping fixture plate and said second clamping fixture plate, and at least one threaded rod disposed through said first and second clamping fixture plates and said base plate operably connecting said clamping fixture plates and having a plurality of threaded nuts disposed thereon adjacent said first and second clamping fixture plates and said base plate.

In an alternative embodiment, a multiple station clamping fixture unit comprises a clamping fixture disposed about a container neck, the clamping fixture having a spring biased plunger extending through the clamping fixture and sealably engaging a container dispensing aperture, the clamping fixture comprising a clamping plate having a plurality of plate apertures therein and a plurality of stop posts depending from the clamping plate, the clamping plate apertures having a plurality of jaws extending therethrough, the clamping fixture further comprising a plunger collar operably connected to the clamping plate, the plunger collar having a flange at a lower end and a helical thread circumscribing an upper inner surface of the collar, the plurality of jaws depending from the flange of the plunger collar, a plunger having a plunger shaft and a plunger head, the plunger positioned through the plunger collar, a handle threadably disposed in the collar, a spring disposed between the handle and the plunger head, the clamping fixture further comprising a slide plate having a plurality of tapered slide plate apertures therein, the slide plate having a plurality of locking arms depending from a peripheral edge of the slide plate, the locking arms each having at least one locking tab, the clamping fixture further comprising a base plate, the base plate having at least one locking bead disposed about the base plate.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which:

FIG. 2 shows a side view of the clamping fixture of FIG. 1

FIG. 6 shows a side sectional view of an automated multiple station clamping fixture of the present invention;

DETAILED DESCRIPTION OF THE PREFERRED EMBODIMENT

Manually Operated Clamping Fixture

Figure 3:
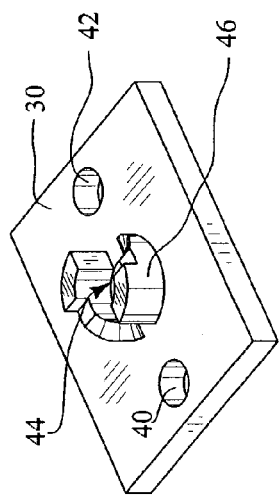
FIG. 3 shows a perspective view of the first clamping fixture plate of FIG. 1.
Figure 1:
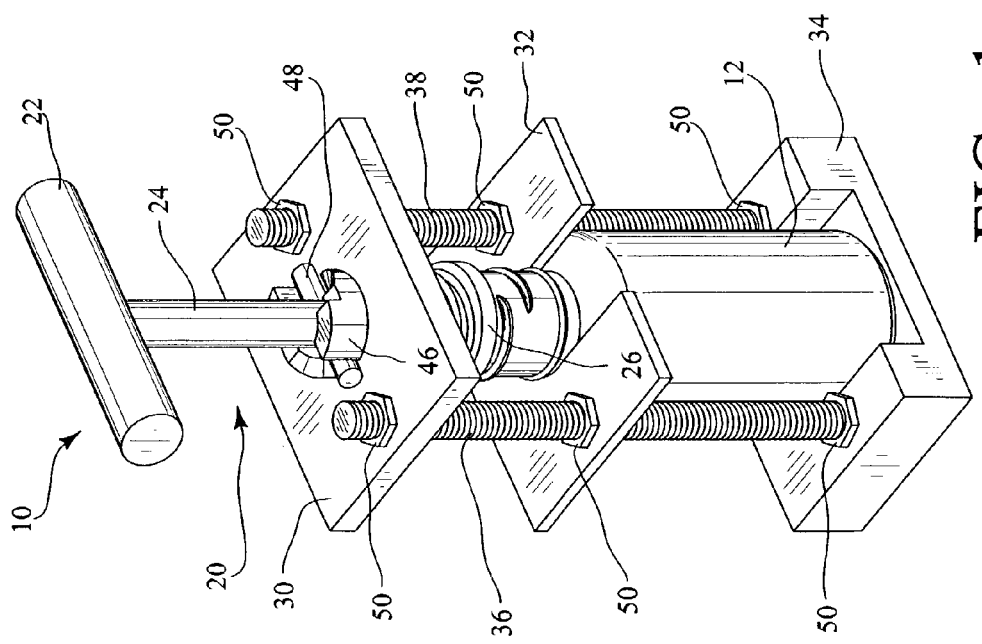
FIG. 1 shows a perspective view of a manually operated clamping fixture of the present invention.

The present invention will now be described in conjunction with the drawings, referring initially to FIGS. 1 and 2 a manually operated clamping fixture 10 is shown for use with a container 12, having a peelable seal 14 and a container neck 16. As described above an apparatus is needed for applying pressure to a peelable seal 14 during a sterilization retort process in order to prevent leakage of the seal during the high temperature, high pressure process. In accordance with a first embodiment and as seen in FIGS. 1 and 3, the clamping fixture 10 comprises a first clamping fixture plate 30 having a first rod hole 40 and a second rod hole 42. Centrally disposed through the clamping fixture plate 30 is a plunger aperture 44 being preferably round in shape, but other shapes may be used which cooperate with a plunger shaft 24 described herein.

Disposed about the plunger aperture 44 is a plunger collar 46. The plunger collar 46, defined by a wall, is preferably substantially cylindrical in shape but may also be any other shape, which may cooperate with the plunger shaft 24. As depicted in FIGS. 1 and 2, extending radially outward from the plunger shaft 24 through the plunger collar 46 is at least one collar pin 48. The collar wall 46 may be stepped such that as the plunger shaft 24 is rotated, the pin 48 follows the collar wall 46 like a cam and cam follower causing linear vertical motion of the plunger shaft 24. This arrangement may be substituted by other means for changing rotation to linear motion such as a worm and worm gear, threaded plunger and plunger collar, or other power transmission devices.

Extending through the first and second rod apertures 40,42 are first and second threaded rods 36,38. The rods 36,38 may vary in size depending on the strength required to hold the container 12, pressure being placed on the peelable seal 14, and the size of the container 12 being used. The threaded rods 36,38 are preferably formed of some material which is corrosion resistant such as aluminum or stainless steel and which will not be compromised by the water, heat, and/or pressure associated with the sterilization retort process. The threaded rods 36,38 are used to maintain a plunger 20 and clamping plates 30,32,34 in alignment with the container 12 and peelable seal 14. In order to fix the position of the first clamping fixture plate 30 relative to the neck 16 of the container 12 and a second clamping fixture plate 32, threaded nuts 50 are positioned on the first and second threaded rods 36,38, one above and one below the first clamping fixture plate 30.

Figure 4:
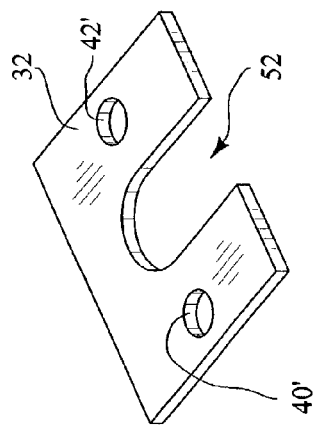
FIG. 4 shows a perspective view of the second clamping fixture plate of FIG. 1.

Referring now to FIGS. 1, 2, and 4, located below the first clamping fixture plate 30 is a second clamping fixture plate 32 preferably formed of a material such as aluminum, stainless steel, or some other strong, corrosion resistant, high temperature and pressure resistant material. The second clamping fixture plate 32 is preferably substantially rectangular in shape having first and second rod apertures 40',42'. A U-shaped channel 52 maybe centrally located in the second plate 32 being sized so as to be disposed around a container neck 16 beneath a neck bead or tamper indicating bead. Moreover, the first and second rod apertures 40', 42' are disposed so that when the U-shaped channel 52 is firmly seated against the container neck 16, the first and second apertures 40', 42' will be aligned with the threaded rods 36,38 and first and second apertures 40,42. The first and second threaded rods 36,38 are disposed through first and second rod apertures 40', 42' with a threaded nut 50 being positioned above and below the second clamping fixture plate 32. The threaded nuts 50 adjacent the second clamping fixture plate 32 position the second plate 32 relative to the container neck 16 and the first plate 30.

Referring now to FIGS. 1 and 2, a plunger 20 is disposed through plunger collar 46 of the first clamping fixture plate 30. The plunger 20 has a plunger handle 22, a plunger shaft 24 depending from the plunger handle 22, and a plunger head 26. The plunger handle 22 and shaft 24 are preferably made of some strong, lightweight, non-corrosive material such as aluminum or stainless steel. The plunger head 26 is positioned at a distal end of the plunger shaft 24 opposite the handle 22 and may be sized to firmly abut a top surface of the peelable seal 16 of the container 14. The plunger head 26 is further formed of a material having a resting thickness at ambient temperature and pressure conditions but capable of being compressed to a thickness less than the resting thickness. The plunger head 26 should also be able to recover to a thickness in order to maintain a positive pressure against the peelable seal or closure (not shown). Preferably, the plunger head 26 is made from a material selected from the group consisting of a silicone-based material, urethane, latex, rubber, thermoplastic elastomers, thermoset elastomers or a combination thereof.

Disposed between the lower surface of the first clamping fixture plate 30 and the plunger head 26 is a plunger spring 28. The spring 28 places a spring bias or force on the plunger 20 in order to maintain a positive pressure on the peelable seal 14. As the plunger handle 22 is rotated the collar 46 causes the plunger 20 to move into either a locked or unlocked position. With the plunger 20 rotated to the locked position, as shown in FIG. 8C, the threaded nuts 50 adjacent the first clamping fixture plate 30 may be raised or lowered to adjust the compression of spring 28. When the first plate 30 moves downward, the plunger spring 28 will be compressed placing increased force on the plunger head 26. In contrast, when the first plate 30 moves upward, the plunger spring 28 extends placing less force on the plunger head 26.

Figure 5:
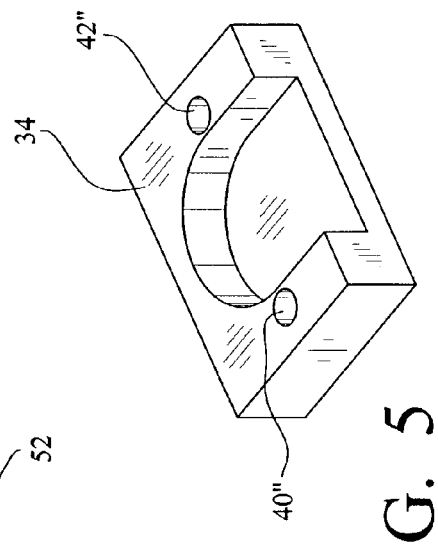
FIG. 5 shows a perspective view of the third clamping fixture plate or base plate of FIG. 1.

The first and second threaded rods 36,38 may extend below the second clamping fixture plate 32 to a third clamping fixture plate or base plate 34. The base plate 34, shown in FIGS. 1, 2, and 5, preferably has a substantially U-shaped seat 54 wherein a container 14 may be located. Adjacent the seat 54 are base plate apertures 40",42" wherein the first and second threaded rods 36,38 may be positioned. The base plate aperture 40",42" are preferably threaded to rotatably accept the threaded rods 36,38. Threaded nuts 50 may be positioned on the threaded rods 36,38 to lock the base plate 40",42" in position.

In use the container 12 is positioned in the base plate 34 and the first and second threaded rods 36,38 are threadably positioned in the rod apertures 40", 42". Next, the U-shaped channel 52 of the second clamping fixture plate 32 is disposed about the container neck 16, potentially beneath a TI bead or other retaining structure, and the threaded rods 36,38 are disposed through rod apertures 40', 42'. Threaded nuts 50 may be positioned above and below the second clamping fixture plate 32 to lock the plate 32 in position. Above the second clamping fixture plate 32 is the first clamping fixture plate 30. Disposed therethrough is a spring biased plunger 20, having the plunger spring 28 seated on the plunger head 26 and the bottom surface of the first clamping fixture plate 30. The plunger head 26 is seated on a container top wall which may have a seal placed thereon. In the alternative, the plunger head 26 may be seated on a closure having a seal placed within the closure. A plunger handle 22 may be rotated which moves pin 48 about the collar 46 to lock the plunger 20. Next, first fixture clamping plate 30 may be adjusted with threaded nuts 50 to adjust the pressure placed on the container seal 14 by the plunger head 26. This preselected pressure is based on the vapor pressure that develops within the container 14 during the retort process. Once the container 14 is positioned in the clamping fixture 10, the entire fixture can be moved through a sterilization water bath. The water bath may have a depth of upto about 200 feet and a variable temperature from near ambient at the bath surface to a temperature between about 212° F. to 270° F. near the bottom of the water bath. The fixture clamp 10 and container 12 are lowered through the water bath and as the depth of the container in the water bath increases, the temperature of and pressure on the container 12 increases. The external pressure on the container 12 may be as high as 50 psi. The temperature and pressure on the container may cause an increase in vapor pressure within the container 12 to as high as 15 psi. The plunger 126 disposed against the container rim and pressing on the seal 14 counteracts the internal vapor pressure to maintain integrity of the seal 14 along the container rim as the container 12 and clamping fixture 10 are slowly raised from the water bath.

Automated Multiple Station Retort Clamping Fixture

Figure 7:
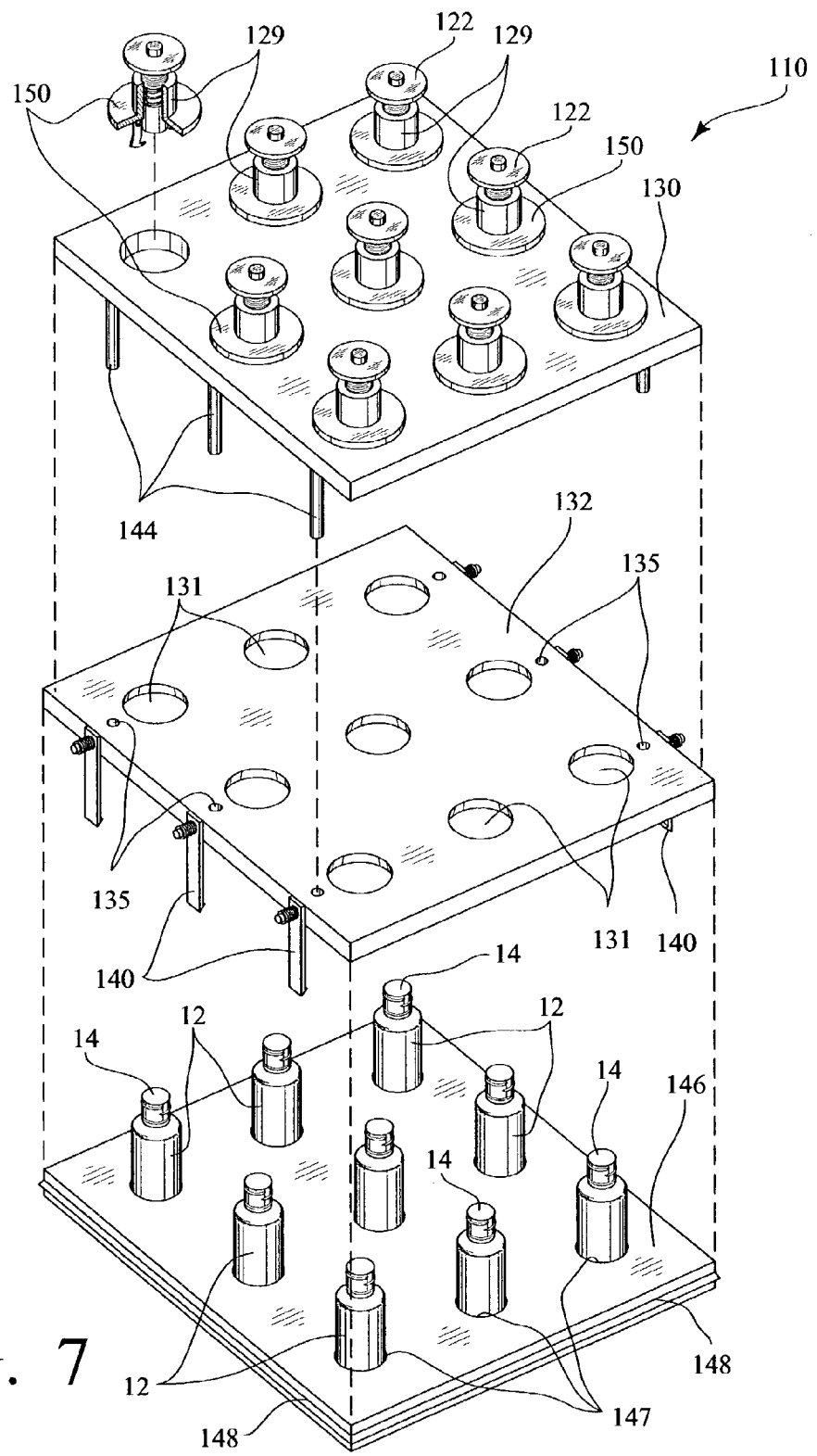
FIG. 7 shows a assembly view of an automated multiple station clamping fixture of the present invention and, FIGS. 8a-8c show a sequence of the automated multiple station clamping fixture of FIG. 6.

In accordance with another embodiment of the present invention, a multiple station retort clamping fixture 110 is provided for automated use with a plurality of containers 12. Referring now to FIGS. 6, 7, and 8, the automated multiple station clamping fixture 110 has a base plate 146 which may be of various geometric configurations having a plurality of cut-away portions or seats 147 therein for placing a plurality of containers 14. The cut-away portions 147 are preferably circular in shape but may be other shapes depending on the shape of the container 14 to be seated therein. The base plate 146 is preferably formed of some material which is corrosion resistant, temperature resistant, and pressure resistant to the effects of the retort process. Along an outer peripheral edge of the base plate 146 may be a locking bead 148 which may hold the automated multiple station clamping fixture 110 together in a locked position.

Above the base plate 146 is a clamping fixture plate 130 being preferably the same shape as the base plate 146. The base plate 146 may be made from aluminum, stainless steel, or some rigid polymeric material which is preferably corrosion resistant as well as resistant to heat and pressure characteristics associated with the retort process. The clamping fixture plate 130 has a plurality of holes or apertures 131 therein, through which a plunger 120 may pass or a container neck 16 may be disposed.

Depending from a collar flange 150 are a plurality of rotatably connected jaws or clamps 134 which engage a container 12 beneath a TI bead or other retaining structure thereby providing a grasp against which a plunger 120 may provide a force on the container seal 14. The jaws 134 are preferably formed of a material which is corrosion resistant and resistant to the temperatures and pressures associated with a retort process. There are preferably three jaws 134 per clamping plate aperture 131 spaced apart about 120 degrees although various other spacing configurations may be used. The jaws extend through the clamping fixture plate 130 and a slide plate 132.

Depending from the clamping fixture plate 130 are a plurality of stop posts 144. The stop posts 144 may be square or circular in section and abut the base plate 146 when the automated multiple station retort clamp fixture 110 is in a closed position as shown in FIGS. 8b and 8c. The stop posts 144 are also formed of some material that is resistant to corrosion as well as temperature and pressure characteristics associated with the retort process.

Slidably disposed between the clamping fixture plate 130 and the base plate 146 is the slide plate 132 which provides an inwardly directed force on the jaws 134. The slide plate 132 has a plurality of holes or apertures 133 therein through which the jaws or clamps 134 pass as well as the container neck 16. In order for the slide plate 132 to slide vertically in a guided fashion, the slide plate 132 also has guide holes 135 throughwhich the stop posts 144 extend. The walls of apertures 133 are preferably tapered and abut the jaws 134. As the slide plate 132 lowers, the taper of the slide plate apertures 133 force the jaws 134 to close against the container neck 16 held in the base plate 146.

Along the outside of the slide plate 132 may be a plurality of locking arms 140. The locking arms 140 are fastened to the slide plate 132 by a fastener 136. The fastener 136 is positioned through the locking arm 140 and preferably has a fastener spring 138 disposed along the fastener 136 between a fastener head and the slide plate 132 providing an inwardly directed force on locking arm 140. At a distal end of the locking arm 140, may be a locking tab 142. As the slide plate 132 moves downward, the locking tab 142 will slide over locking bead 148 of the base plate 146. The locking bead 148 in combination with the locking tab 142 hold the slide plate 132 in a downward position thereby maintaining the jaws 134 in a closed position against the container neck 16.

Disposed above the clamping fixture plate 130 is a plunger collar 129 having a flange 150 at a lower end thereof for attaching to the clamping fixture plate 130. At an upper end of the collar 129 along an inner surface may be a helical thread disposed along an inner surface of the collar 129 as seen in FIGS. 8*a*-8*c*. Threadably attached to collar 129 is preferably a handle 122. The handle 122 may have a round upper portion with a hollow central portion throughwhich a plunger mechanism 120 is disposed. The plunger mechanism 120 includes a plunger shaft 124 and a plunger head 126. Within the collar 129 between a lower surface of the handle 122 and a plunger head 126 is a plunger spring 128 for providing a spring bias on the plunger 120. The plunger mechanism 120 is preferably formed of a material which may withstand the temperature and pressure effects associated with the sterilization retort process. The plunger spring 128 is compressed at a first end against the stationary handle 122 and at a second end against a slidable plunger head 126. Thus, by rotatably adjusting the vertical displacement of handle 126, the force on the plunger head 126 may be adjusted. In turn, this configuration allows adjustment to a preselected pressure for application on the container seal 14.

In use the base plate 146 is positioned for filling the container seats 147 with containers 14 having sealed dispensing apertures to begin the retort process. This may be done by hand or preferably in an automated fashion, such as by robotic arm or other placement means. As shown in FIGS. 8*a*-8*c* with the containers 14 seated in the base plate 146, the clamping fixture plate 130, the plunger collar 129, and the slide plate 132 are lowered until the plunger head 126 contacts the seal 14 disposed over the container rim. The plunger collar 129, clamping fixture plate 130, and slide plate 132 may be moved by either hydraulic force, compressed air, or some other means known to those skilled in the art. The collar 129, the clamping fixture plate 130, and the slide plate 132 continue downward until the stop posts 144 contact the base plate 146. When this occurs, the clamping fixture plate 130 and the collar 129 will stop their downward motion. However, the slide plate 132 will continue moving downward along the stop posts 144 until the locking tabs 142 engage the locking beads 148 of the base plate 146. As the slide plate 132 moves downward, the jaws 134 are forced closed around the container neck 16, beneath a TI bead or other structure. When the locking tabs 142 engage the locking bead 148 the automated multiple station retort clamping fixture 110 may be submerged in a water bath to begin the retort process. The water bath may have a depth of upto about 200 feet and a variable temperature from near ambient at the bath surface to a temperature between about 212° F. to 270° F. near the bottom of the water bath. The container 12 and automated clamping fixture 110 are lowered through the water bath and as the depth of the container in the water bath increases, the temperature of and pressure on the container increases. The external pressure on the container may be as high as 50 psi. The temperature and pressure on the container may cause an increase in vapor pressure within the container to as high as 10 psi. The plunger 126 disposed against the container rim and pressing on the seal 14 counteracts the internal vapor pressure to maintain integrity of the seal 14 along the container rim until the container and automated clamping fixture 110 are slowly raised from the water bath.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

We claim:

1. A clamping fixture for a container used in a retort thermal process, comprising:
    a clamping fixture having a clamping fixture plate and a spring biased plunger extending through said clamping fixture plate;
    said spring biased plunger adapted to compressively engage a container;
    said clamping fixture having a plurality of stop posts depending from a lower surface of said clamping fixture plate;
    said clamping fixture having a slide plate said slide plate slidably connected to said stop posts said slide plate having a plurality of apertures therein said apertures having taper walls;
    said clamping fixture having a plunger collar having a flange at a lower end, said plunger collar receiving a plunger shaft affixed to said plunger; and
    said plunger collar having a helical thread circumferentially extending about an upper inner surface of said collar.

2. The clamping fixture of claim 1, wherein said plunger shaft is disposed through said clamping fixture plate and said plunger shaft extends through and is axially aligned with a plunger spring.

3. The clamping fixture of claim 1, further comprising a plurality of jaws reciprocally connected to said plunger collar and extending through said clamping fixture plate and said slide plate.

4. The clamping fixture of claim 3, further comprising a handle threadably disposed in said plunger collar and affixed to said plunger.

5. The clamping fixture of claim 3, further comprising a spring disposed between a handle and a plunger head, said plunger head positioned at a distal end of said plunger shaft.

6. The clamping fixture of claim 1, said slide plate having a plurality of locking arms depending from a peripheral edge of said slide plate, said locking arms each having at least one locking tab.

7. The clamping fixture of claim 1, further comprising a base plate.

8. The clamping fixture of claim 7, said base plate having at least one locking bead disposed about a peripheral edge of said base plate.

9. A clamping fixture and container adapted for use in a retort process, comprising:

a clamping fixture disposed about a neck of a container;

said clamping fixture having a spring biased plunger extending through said clamping fixture and compressively engaging a dispensing aperture defined by said container neck;

said clamping fixture having a clamping fixture plate;

a slide plate having a plurality of tapered slide plate apertures therein;

said slide plate having a plurality of locking arms depending from a peripheral edge of said slide plate, said locking arms each having at least one locking tab;

a plunger collar having a plurality of jaws pivotally connected thereto said jaws extending through said slide plate and said clamping fixture plate;

said clamping fixture further having a plunger collar operably connected to said clamping plate, said plunger collar having a helical thread circumscribing an upper inner surface of said collar;

a plunger having a plunger shaft and a plunger head, said plunger positioned through said plunger collar;

a handle threadably disposed in said collar;

a spring disposed between said handle and said plunger head;

said clamping fixture further having a base plate, said base plate having at least one locking bead disposed about said base plate.

10. The clamping fixture and container of claim 9, wherein said plunger head selected from the group consisting of a silicone-based material, urethane, latex, rubber, thermoplastic elastomers, thermoset elastomers or a combination thereof.

* * * * *

UNITED STATES PATENT AND TRADEMARK OFFICE
CERTIFICATE OF CORRECTION

PATENT NO. : 7,644,902 B1  Page 1 of 1
APPLICATION NO. : 10/449335
DATED : January 12, 2010
INVENTOR(S) : Julian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1991 days.

Signed and Sealed this

Sixteenth Day of November, 2010

David J. Kappos
*Director of the United States Patent and Trademark Office*